United States Patent [19]

Schupp et al.

[11] Patent Number: 4,542,173
[45] Date of Patent: Sep. 17, 1985

[54] SURFACE COATING BINDERS WHICH ARE SELF-CROSSLINKING WHEN HEATED, THEIR PREPARATION AND THEIR USE

[75] Inventors: Eberhard Schupp, Schwetzingen; Werner Loch, Erpolzheim; Rolf Osterloh, Gruenstadt; Klaas Ahlers, Muenster, all of Fed. Rep. of Germany

[73] Assignee: BASF Aktiengesellschaft, Fed. Rep. of Germany

[21] Appl. No.: 547,091

[22] Filed: Oct. 31, 1983

[30] Foreign Application Priority Data

Mar. 30, 1983 [DE] Fed. Rep. of Germany ....... 3311517

[51] Int. Cl.$^4$ ............................................. C08L 63/02
[52] U.S. Cl. .................................. 523/414; 204/181.7; 523/420; 523/426; 524/555; 524/591; 524/612; 524/901; 525/386; 525/523; 525/533
[58] Field of Search ............... 525/523, 459, 386, 533; 523/414, 420; 528/118, 121, 123; 524/901, 555, 591, 612

[56] References Cited

U.S. PATENT DOCUMENTS 4,071,482 1/1978 Hopkins, Jr. ....................... 524/108
4,388,435 6/1983 Loch ................................... 524/548

FOREIGN PATENT DOCUMENTS 3121765 6/1981 Fed. Rep. of Germany .
1409728 10/1975 United Kingdom .

Primary Examiner—Theodore E. Pertilla
Attorney, Agent, or Firm—Keil & Weinkauf

[57] ABSTRACT

The present invention relates to surface coating binders which are self-crosslinking when heated and are based on resin-like polyadducts, polycondensates or polymers. These binders have a mean molecular weight $\overline{M}_n$ of from 500 to 10,000 and contain, on average per molecule, at least two groups of the general formula

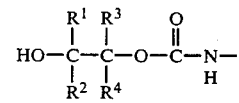

wherein $R^1$, $R^2$, $R^3$ and $R^4$ are identical or different and are each hydrogen or a methyl or ethyl radical, and additionally contain hydroxyl and/or primary and/or secondary amino groups and may or may not contain tertiary amino groups.

They can be prepared by reacting appropriate resins containing primary amino groups with cyclic carbonates, and can be used, in solution in an organic solvent, as baking finishes, as well as for the preparation of cathodic electrocoating finishes.

5 Claims, No Drawings

SURFACE COATING BINDERS WHICH ARE SELF-CROSSLINKING WHEN HEATED, THEIR PREPARATION AND THEIR USE

The present invention relates to surface coating binders which are self-crosslinking when heated and which harden without acid catalysis and without splitting off formaldehyde, and to processes for their preparation and their use.

Self-crosslinking surface coating binders consisting of copolymers of various monomers, as a rule acrylates or methacrylates which contain, as copolymerized units, larger or smaller amounts of etherified methylol acrylamide or methylol methacrylamide, are known. Their activity is associated with the presence of acidic groups in the binder, or at least with the absence of basic groups, and this not only restricts their possible uses but, on metallic substrates, can also lead to corrosion as a result of the acid remaining in the film; furthermore, during the crosslinking reaction formaldehyde is always split off, in some cases in substantial amounts.

German Pat. No. 2,252,536 describes self-crosslinking binders for cathodic electrocoating. These consist of a polyurethane resin which is prepared by reacting an epoxy-containing organic compound with a secondary amine and a partially blocked polyisocyanate. Primary aliphatic alcohols are preferred blocking agents. In order that adequate crosslinking is achieved at temperatures <200° C. when these blocking agents are used, aromatic polyisocyanates are required as starting materials. However, it is known that aromatic polyisocyanates have a strong tendency to yellowing. Although this is unimportant for many end uses, for example white cathodic electrocoating finishes, which are also of great importance generally, cannot be obtained in this manner.

It is an object of the present invention to eliminate these disadvantages, ie. to provide surface coating binders which are self-crosslinking when heated and which give baking finishes which are dissolved in organic solvents and which harden in the absence of acid, without splitting off formaldehyde. A further object of the present invention comprises providing surface coating binders which are self-crosslinking when heated and which can be diluted with water after neutralization with an acid, can be deposited on a metallic substrate serving as a cathode, and can be baked at temperatures <200° C. to give films which do not yellow.

The present invention relates to surface coating binders which are self-crosslinking when heated and are based on resin-like polyadducts, polycondensates or polymers, wherein the binders have a mean molecular weight $M_n$ of from 500 to 10,000 and contain, on average per molecule, at least two groups of the general formula (I)

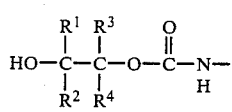

wherein $R^1$, $R^2$, $R^3$ and $R^4$ are identical or different and are each hydrogen or a methyl or ethyl radical, and additionally contain hydroxyl and/or primary and/or secondary amino groups, and may or may not contain tertiary amino groups.

The present invention also relates to a process for the preparation of such surface coating binders, wherein appropriate resin-like intermediates which instead of the groups of the general formula (I) contain primary amino groups, ie. resin-like polyadducts, polycondensates or polymers which contain at least two primary amino groups per molecule, are reacted with from 25 to 200 mole %, based on all primary amino groups present, of at least one cyclic carbonate of the general formula (II)

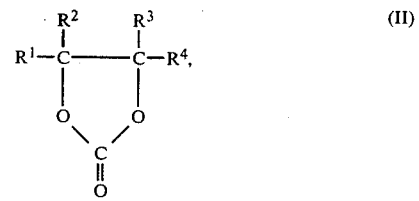

wherein $R^1$, $R^2$, $R^3$ and $R^4$ have the meanings given in formula (I), at temperatures of from 0° to 80° C.

The resin-like polyadduct, polycondensate or polymer which possesses at least two primary amino groups per molecule and can be used for this purpose is preferably, for example, a reaction product of at least one aromatic or aliphatic epoxy resin with at least one polyamine which contains at least two primary amino groups per molecule, or with a polyamine having at least one amino group, which is present in latent form as a ketimine group, and an additional secondary amino group.

The present invention furthermore relates to surface coating binders of this type which can be diluted with water as a result of partial or complete neutralization with an acid.

The present invention furthermore relates to the use of the novel surface coating binders as components of organic solutions of baking finishes and to the preparation of cathodic electrocoating finishes.

Regarding the surface coating binders, the following may be stated specifically: The resin-like intermediates for the preparation of the novel surface coating binders can be selected from a very large variety of classes of compounds; it is important that they contain, on average, at least two primary amino groups per molecule and additionally contain hydroxyl groups and/or secondary amino groups, and may or may not contain tertiary amino groups.

Examples of suitable materials are polyethers containing primary amino groups, copolymers of $\alpha,\beta$-ethylenically unsaturated compounds whose primary amino groups have been introduced as a result of a polymer-analogous reaction, polyurethane-ureas containing primary amino groups, and epoxide/amine adducts.

Examples of suitable polyethers are aliphatic or araliphatic polyethers which are obtained by reacting dihydric and/or polyhydric alcohols with various amounts of ethylene oxide and/or propylene oxide and then exchanging some of the OH groups for primary amino groups, using ammonia.

Examples of copolymers whose primary amino groups have been introduced by polymer-analogous reactions are:

(a) hydrogenation products of copolymers comprising from 40 to 70% by weight of vinyl-aromatics, for example styrene or vinyl toluene, from 10 to 55% by weight of acrylonitrile or methacrylonitrile and/or acrylamide or methacrylamide and from 5 to 20% by weight of esters of $\alpha,\beta$-ethylenically unsaturated carboxylic acids, for example esters of acrylic acid, methacrylic acid, maleic acid, fumaric acid or itaconic acid with alcohols of 1 to 18 carbon atoms, OH-containing esters, for example hydroxyethyl or hydroxypropyl acrylate or methacrylate, being preferred.

(b) hydrolysis products of copolymers comprising from 40 to 70% by weight of vinyl-aromatics, for example styrene or vinyl toluene, from 10 to 55% by weight of N-vinylamides of monocarboxylic acids, for example N-vinylformamide, and from 5 to 20% by weight of vinyl esters of monocarboxylic acids of 2 to 18 carbon atoms, vinyl acetate being preferred.

Suitable polyurethane-ureas which contain on average more than two primary amino groups per molecule can be obtained, for example, from aliphatic and/or aromatic diisocyanates, for example tetramethylene diisocyanate, hexamethylene diisocyanate, isophoron diisocyanate, diphenylmethane diisocyanate, toluylene diisocyanate, naphthylene diisocyanate and 4,4'-diphenyl ether diisocyanate, and if appropriate dimers or trimers of these, and aliphatic diols, such as ethylene glycol, diethylene glycol, triethylene glycol, polyethylene glycols, propanediol, butanediol, hexanediol, neopentylglycol or neopentylglycol hydroxypivalate, and if appropriate polyhydric alcohols, such as trimethylolpropane, glycerol, pentaerythritol, trimethylolbenzene or trishydroxyethyl isocyanurate, mixed with aliphatic diamines, for example ethylenediamine, propylenediamine, 1,4-butanediamine, 1,5-pentanediamine, neopentanediamine, hexamethylenediamine, diaminocyclohexane, diaminodicyclohexylmethane, 3,3'-dimethyl-4,4'-diaminodicyclohexylmethane, 4,9-dioxadodecane-1,12-diamine and if appropriate amines containing a larger number of amino groups, for example trisaminoethylamine or 1,1,1-trisaminopropoxymethylpropane.

Particularly preferred resin-like intermediates which contain on average at least two primary amino groups per molecule are epoxide/amine adducts which are obtained by reacting epoxy resins together with primary or secondary amines.

Examples of suitable epoxy resins are polyglycidyl ethers of polyphenols, for example 2,2-bis-(4-hydroxyphenyl)-propane, 1,1-bis-(4-hydroxyphenyl)-ethane, bis-(4-hydroxyphenyl)-methane, bis-(2-hydroxynaphthyl)-methane and the like, which can be prepared by etherifying the stated polyphenols with epichlorohydrin in the presence of an alkali, polyglycidyl ethers of polyhydric alcohols, which can be obtained by appropriate reaction of epichlorohydrin with polyhydric alcohols, such as ethylene glycol, diethylene glycol, triethylene glycol, propylene 1,2-glycol, 1,3-propanediol, 1,5-pentanediol, 2,2-bis-(4-hydroxycyclohexyl)-propane, glycerol, trimethylolpropane, pentaerythritol and the like, as well as N,N'-diglycidyl derivatives of N-heterocyclic compounds and triglycidyl isocyanurate.

For reasons of flexibility, it can be advantageous to modify the stated epoxy resins before reaction with amines, with less than the equivalent amounts of long-chained polyfunctional alcohols or mercaptans.

While the reaction of the mercaptans with epoxide groups takes place even in the absence of a catalyst, the reaction of the alcohols requires the use of a catalyst, for example dimethylbenzylamine, and relatively high temperatures (from 50° to 150° C.).

It is also possible to carry out elastification by means of long-chain secondary diamines, for example dimeric fatty acid bis-[2-(2-hydroxyethylamino)-ethyl]-amides, which are likewise employed in less than the equivalent amounts. In this case, elastification can be carried out at the same time as the reaction with the amine.

A possible method of obtaining epoxide/amine adducts which contain on average at least two primary amino groups per molecule comprises reacting an excess of primary diamines with the abovementioned epoxy resins and then separating off the excess amine at elevated temperatures and under reduced pressure.

Particularly suitable diamines for this purpose are those of two to six carbon atoms, for example ethylenediamine, 1,2- and 1,3-diaminopropane, 1,4-diaminobutane, neopentanediamine and hexamethylenediamine. If no prior elastification has taken place, the reaction product can be subjected to a chain-lengthening reaction with a dicarboxylic acid, for example with sebacic acid or a dimeric fatty acid. The desired molecular weight can be obtained by varying the ratio of dicarboxylic acid to epoxide/amine adduct; for example, one mole of dimeric fatty acid can be employed per two molecules of epoxide/amine adduct.

Another possible method of preparing products which contain primary amino groups and are suitable for the novel process is to react epoxy resins with secondary amines containing blocked primary amino groups. Examples of such amines are the diketimine of diethylenetriamine, the ketimine of aminoethylethanolamine, the ketimine of N-aminoethylpiperazine and the ketimine of N-methylethylenediamine. The ketimines can be prepared in a simple manner from the free amines and a ketone, for example methyl isobutyl ketone, water being separated off. In the reaction with epoxy resins, only the secondary amino group reacts; the ketimine can then be cleaved simply by adding water, the free primary amino group being formed. By converting some of the primary amino groups with a dicarboxylic acid, these products, too, can be elastified by chain-lengthening.

The novel surface coating binders are prepared in general by reacting the resin-like intermediates containing at least two primary amino groups per molecule with from 25 to 200, preferably from 50 to 125, mole %, based on all primary amino groups present, of at least one cyclic carbunate of the general formula (II)

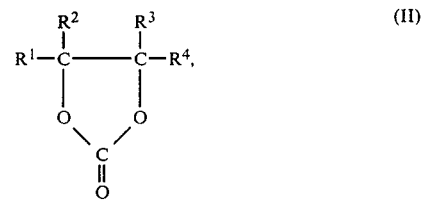

wherein $R^1$, $R^2$, $R^3$ and $R^4$ are each hydrogen or a methyl or ethyl radical.

Examples of suitable cyclic carbonates are ethylene carbonate, propylene carbonate, isobutylene carbonate, butylene carbonate and the like. They are obtainable in a simple manner by reacting the corresponding epoxides with carbon dioxide.

Reaction of the resin-like products containing primary amino groups (polyadducts, polycondensates or polymers containing at least two primary amino groups per molecule) with the cyclic carbonates is carried out either in the absence of a solvent or in a suitable solvent, for example water, an alcohol, an ether, an ester, a ketone, a halohydrocarbon, an aromatic hydrocarbon or an aliphatic hydrocarbon, or a mixture of these solvents. In this case, the reactants should be substantially or completely soluble in the solvent or solvent mixture used, and the latter should contain neither primary or secondary amino groups nor mercapto groups, which can also react with the cyclic carbonates. Preferred solvents are water, alcohols, and ether-alcohols, for example methanol, ethanol, propanols, butanols and monoethers of diols, for example ethylene glycol, diethylene glycol, propylene glycol or dipropylene glycol, with the first-mentioned monoalkanols.

The reaction of the resins containing primary amino groups with the cyclic carbonates is carried out at temperatures of from 0° to 80° C., preferably from 15° to 40° C. In a particularly preferred embodiment of the novel process, the reactants are mixed at room temperature and left to stand until the amine number has decreased to the required value. The reaction times are in general from one hour to 48 hours. The surface coating binders according to the invention have mean molecular weights $\overline{M}_n$ of from 500 to 10,000 and contain, on average per molecule, at least two groups of the formula (I) and additionally contain hydroxyl groups and/or further primary and/or secondary amino groups and may or may not contain tertiary amino groups. They can be processed by conventional methods, together with soluble dyes, fillers, pigments and the like, to give organic solutions of coating agents. These can contain further additives conventionally used in surface coating technology, for example levelling agents, antifoams, wetting agents and curing catalysts, as well as minor amounts of additional crosslinking agents and further binders.

They can be processed by a conventional method, such as brushing, knife-coating, spraying, rolling, casting or printing. Preferably, they are processed by spray-coating by various conventional methods, either by means of a compressed-air spraygun or in an electrostatic unit. The novel surface coating binders and the coatings produced from them are suitable for coating various types of substrates, eg. metal, glass, ceramics and the like. The preferred substrate is metal.

After application onto the substrate to be coated, the wet films are dried in the air for a short time if required and are then baked at temperatures of from 130° to 200° C., preferably from 150° to 180° C. The baking times are in general from 20 to 30 minutes. To accelerate hardening, it is advantageous if curing catalysts are present.

Preferred curing catalysts are tin compounds, for example dibutyl-tin dilaurate, dibutyl-tin oxide, tin acetate and the like. Lead compounds, for example lead naphthenate, lead octoate or lead acetate are also suitable. The amounts added are from 0.5 to 4, preferably from 1 to 2.5, % by weight, based on the surface coating binder.

If the preferred epoxide/amine adducts are employed as the resin-like intermediate for the preparation of the novel surface coating binders, the resins still possess an adequate number of basic nitrogen functions even after the reaction with the cyclic carbonate, so that these resins are water-soluble or water-dispersible after protonation with acids. Hence, they can be employed, in a particularly preferred embodiment of the present invention, as binders for cathodic electrocoating finishes.

The electrocoating finishes are prepared by conventional methods. Organic or inorganic acids, for example formic acid, acetic acid, lactic acid or phosphoric acid, are used as neutralizing agents, carboxylic acids being preferred. They are used in amounts such that the resulting pH of the bath is from 6.5 to 8.0, preferably from 7.0 to 7.5, and hence corrosion of the equipment is avoided. The electrocoating baths can furthermore contain other conventional additives, such as pigments, fillers, levelling agents, wetting agents, surfactants and minor amounts of other surface coating binders and/or crosslinking agents.

Even when the novel surface coating binders are used for this purpose, it is as a rule advantageous to employ curing catalysts; their type and amount have already been mentioned in conjunction with the conventional use of the surface coating binders.

The surface coating binders according to the invention can be used for the cathodic electrocoating of any desired electrically conductive substrates, for example iron, aluminum, copper and the like, which may or may not have been chemically pretreated, eg. phosphated.

The deposition voltages are from 50 to 500 V, preferably from 150 to 350 V. The baking conditions required for hardening the deposited coatings are as described above in the case of the conventional systems.

The Examples which follow are intended to illustrate the subject of the present invention without restricting it. The stated parts and percentages are by weight unless stated otherwise.

EXAMPLE 1

(a) Preparation of an elastified epoxy resin 1,445 parts of a commercial polyglycidyl ether of 2,2-bis-(4-hydroxyphenyl)-propane having an epoxide equivalent weight of 485 are reacted with 412.5 parts of a commercial polycaprolactonediol having an OH equivalent weight of 275 in the presence of 120 parts of xylene and 4.5 parts of dimethylbenzylamine for about 2 hours at 130° C. The epoxide equivalent weight is then 1,070. The resin is diluted with 504 parts of isobutanol to give a solids content of 75%, and is immediately processed further as described under 1(c).

(b) Preparation of a ketimine from methyl isobutyl ketone and N-aminoethylpiperazine 387 parts of N-aminoethylpiperazine and 511 parts of methyl isobutyl ketone are heated together. 54 parts of water are separated off in a temperature range from 113 to 147° C. in the course of 3½ hours. In this manner, an about 75% strength solution of the desired ketimine in methyl isobutyl ketone is obtained.

(c) Preparation of an epoxide/amine adduct containing primary amino groups 489 parts of the ketimine from Example 1(b) (75% strength solution) are added to 2,480 parts of the elastified epoxy resin of Example 1(a) (75% strength solution), and the mixture is heated for 2 hours at 100° C. The epoxide value has then decreased to 0. Thereafter, 40 parts of water are added in order to hydrolyze the ketimine. The mixture is diluted with isobutanol to give a solids content of about 65%, and the product is left to stand overnight.

(d) Preparation of the surface coating binder 470 parts of the epoxide/amine adduct of Example 1(c) are stirred with a solution of 21 parts of ethylene carbonate in 16 parts of isobutanol for 90 minutes at room temperature and for 5½ hours at 40° C.

(e) Preparation of an organic solution of a white finish 2 parts of dibutyl-tin dilaurate are added to a mixture of 154 parts of the surface coating binder from Example 1(d), parts of ethylene glycol monoethyl ether and 50 parts of ethylene glycol monobutyl ether, after which the mixture is converted to a paste with 90 parts of titanium dioxide and is then milled in a sand mill until the particle size (according to DIN 53,203) is <10 μm. After the grinding medium has been separated off, an about 65% strength white finish results. This is applied onto a steel sheet by means of a knife coater (thickness of wet film 100 um) and the film is baked for 20 minutes at 160° C. The resulting very glossy, hard and resilient white surface coating film is resistant to methyl isobutyl ketone (when rubbed up and down 50 times with a ball of cotton wool impregnated with methyl isobutyl ketone).

EXAMPLE 2

(a) Preparation of an epoxide/amine adduct containing primary amino groups 400 parts of hexamethylenediamine are heated at 80° C. An 80% strength solution of 400 parts of a commercial polyglycidyl ether of 2,2-bis-(4-hydroxyphenyl)-propane having an epoxide equivalent weight of 485, in toluene, is then added. After an initial exothermic reaction, the mixture is allowed to continue reacting for 30 minutes at 100° C. Thereafter, excess hexamethylenediamine and toluene are removed by distillation, the internal temperature reaching 180° C. The epoxide/amine adduct obtained has an amine number of 181 mg of KOH/g.

(b) Preparation of the surface coating binder 250 parts of the epoxide/amine adduct from Example 2(a) are dissolved in 107 parts of ethylene glycol monoethyl ether. Thereafter, a solution of 35.5 parts of ethylene carbonate in 15.2 parts of ethylene glycol monoethyl ether is added and stirring is continued for a further hour at 40° C.; the amine number is then 87 mg of KOH/g. Finally, 7 parts of hexylglycol are added.

(c) Preparaton of a cathodic electrocoating finish 1,000 parts of a 10% strength aqueous dispersion are prepared from 145 parts of the surface coating binder from Example 2(b), 2 parts of dibutyl-tin dilaurate, 3.7 parts of glacial acetic acid and water. 66 parts of a pigment paste prepared as described below are added to the stirred dispersion.

Pigment paste:

A binder paste is prepared according to Example 1(a) of German Laid Open Application DOS No. 3,121,765. 200 parts of ethylene glycol monobutyl ether are added to the paste in a reaction vessel, and the mixture is heated at 90° C. A mixture of 396 parts of N-vinylpyrrolidone, 204 parts of vinyl propionate and 1.2 parts of azobisisobutyronitrile is then added dropwise in the course of 2 hours. Polymerization is then continued for 1 hour at 90° C. The resulting solution polymer has a Fikentscher K value of 24. The solids content of the copolymer solution is 76%.

In a stirred ball mill, 250 parts of the above copolymer solution, 210 parts of ethylene glycol monobutyl ether, 555 parts of ethylene glycol monoethyl ether, 837 parts of water, 1,084 parts of kaolin, 217 parts of basic lead silicate, 145 parts of carbon black, 36 parts of rutile and 3,000 parts of glass beads having a diameter 2 mm are stirred for 45 minutes at a speed of 1000 rpm. After the glass beads have been separated off, a black paste having a solids content of 50.6% is obtained.

The electrocoating finish obtained has a pH of 7.8. It is stirred for 24 hours at 30° C. and is then deposited, at a voltage of 150 V and for 2 minutes in each case, on zinc-phosphatized steel sheets which have been made with a cathode. The wet films are washed with water, blown dry with air and baked for 20 minutes at 160° C.

| Properties | |
|---|---|
| Layer thickness | 15 μm |
| Impact penetration work | 160 in × lb |
| Resistance to methyl isobutyl ketone (after rubbing up and down 50 times with a ball of cotton wool impregnated with methyl isobutyl ketone) | not attacked |
| Salt spray test according to ASTM for 480 hours (penetration at the crack) | 0.5 mm |

EXAMPLE 3

(a) Preparation of an epoxide/amine adduct containing primary amino groups

The amine number of the epoxide/amine adduct of Example 2(a) is reduced to a value of 169 mg of KOH/g by removing residual traces of hexamethylenediamine at 180° C. and under 0.25 mbar in a thin-film evaporator. 1,045 parts of the material thus obtained are reacted with 157 parts of a dimeric fatty acid in 97 parts of xylene at 170°–195° C., water being removed. After the elimination of water is complete, the resin formed is diluted with 49 parts of ethylene glycol monobutyl ether and 365 parts of isobutanol.

(b) Preparation of the surface coating binder 263 parts of the epoxide/amine adduct of Example 3(a) are mixed with a solution of 18 parts of ethylene carbonate in 18 parts of ethanol, and the mixture is left to stand overnight. The amine number of the binder obtained is then 75 mg of KOH/g.

(c) Preparation of a cathodic electrocoating finish 1,000 parts of a 10% strength aqueous dispersion are prepared from 148 parts of the surface coating binder from Example 3(b), 2 parts of dibutyl-tin dilaurate, 6.3 parts of lactic acid and water.

66 parts of a pigment paste prepared as described below are added to the stirred dispersion.

Pigment paste

In a stirred ball mill, 273 parts of the epoxide/amine adduct of Example 2(a), 15 parts of lactic acid, 86 parts of ethylene glycol monobutyl ether, 325 parts of titanium dioxide, 50 parts of kaolin, 21 parts of basic lead silicate, 5.5 parts of carbon black and 423 parts of water are milled with 1,200 parts of glass beads (diameter 2 mm) until the particle size according to DIN 53,203 reaches 10 μm. After the glass beads have been separated off, a gray paste having a solids content of 50.5% is obtained.

The electrocoating finish obtained has a pH of 6.8. It is aged for 7 days at 30° C., and cathodically deposited, at a voltage of 330 V and for 2 minutes in each case, on zinc-phosphatized steel sheets. The wet films are washed with water, blown dry with air and baked for 20 minutes at 160° C.

| Properties | |
|---|---|
| Layer thickness | 17 μm |
| Impact penetration work | 160 in × lb |
| Resistance to methyl isobutyl ketone (after rubbing up and down 50 times with a ball of cotton wool impregnated with methyl isobutyl ketone) | not attacked |
| Salt spray test according to ASTM for 480 hours (penetration at the crack) | 0.3 mm |

EXAMPLE 4

Preparation of a cathodic white finish

An about 30% strength aqueous dispersion of the surface coating binder of Example 3(b), is prepared as described in Example 3(c), 60% by weight, based on the non-volatile component, of titanium dioxide is added and the entire mixture is milled overnight on a roller stand with the aid of porcelain balls. After the grinding medium has been separated off, the finished mill base is diluted with water to give a bath having a solids content of 16%.

The white finish is deposited and baked as described in Example 3(c). The coatings obtained show virtually no yellowing and have good resistance to solvents. The gloss is 72% in the 60° geometry.

We claim:

1. A surface coating binder which is self-crosslinking when heated and is based on synthetic polyadducts, polycondensates or polymers, wherein the binder has a mean molecular weight $\overline{M}_n$ of from 500 to 10,000 and contains, on average per molecule, at least two groups of the formula I

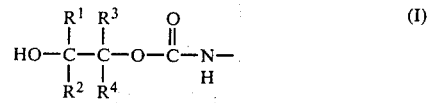

wherein $R^1$, $R^2$, $R^3$ and $R^4$ are identical or different and are each hydrogen or a methyl or an ethyl radical, and additionally contain hydroxyl groups, primary amino groups, secondary amino groups or tertiary amino groups or a combination of 2 or more of said hydroxyl, primary amino, secondary amino and tertiary amino groups.

2. A process for the preparation of a surface coating binder as defined in claim 1, wherein synthetic polyadducts, polycondensates or polymers which contain at least two primary amino groups per molecule are reacted with from 25 to 200 mole %, based on all primary amino groups present, of at least one cyclic carbonate of the formula (II)

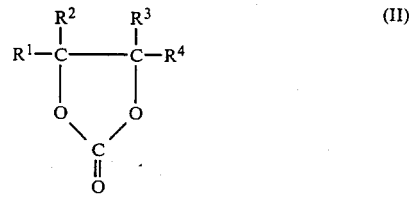

wherein $R^1$, $R^2$, $R^3$ and $R^4$ have the meanings given in formula (I), at temperatures of from 0° to 80° C.

3. The process of claim 2, wherein a reaction product of at least one aromatic or aliphatic 1,2-epoxy resin with at least one polyamine which contains at least two primary amino groups per molecule is used as the synthetic polyadduct, polycondensate or polymer having at least two primary amino groups per molecule.

4. The process of claim 2, wherein a reaction product of at least one aromatic or aliphatic 1,2-epoxy resin with a polyamine which has at least one latent primary amino group, present in the form of a ketimine group, and additionally contains at least one secondary amino group is used as the synthetic polyadduct, polycondensate or polymer having at least two primary amino groups per molecule.

5. The surface coating binder of claim 1, which is partially or completely neutralized with an acid, whereby the binder can be diluted with water.

* * * * *